July 22, 1958 — W. C. GLEISNER, JR., ET AL — 2,843,993
TRIMMER ATTACHMENT FOR POWER MOWER
Filed Feb. 16, 1954

INVENTORS
William C. Gleisner Jr. +
Rudolph J. Wild.
BY
*Elroy J. Wutschel*
ATTORNEY United States Patent Office 2,843,993
Patented July 22, 1958

2,843,993

TRIMMER ATTACHMENT FOR POWER MOWER

William C. Gleisner, Jr., Lisbon, and Rudolph J. Wild, Wauwatosa, Wis., assignors to Francis J. Trecker, West Allis, Wis.

Application February 16, 1954, Serial No. 410,516

4 Claims. (Cl. 56—238)

This invention relates generally to power mowers and more particularly to an improved power mower attachment.

A general object of the invention is to provide an improved power mower.

Another object of the invention is to provide a sickle bar attachment for use with a power mower.

Still another object of the invention is to provide a power mower having a detachable sickle bar.

Another object of the invention is to utilize a sickle bar attachment with any standard type power lawn mower or to detach the same from the frame of the lawn mower and use the sickle bar for triming purposes with power therefor still originating from the motor on the mower.

Yet another object is to utilize the power unit on a lawn mower for driving a sickle attachment which may be readily carried on the front of the mower and used for grass or weed topping purposes.

Another object of the invention is to provide a sickle bar attachment detachably mounted on the front of a power mower.

Another object is to provide a universal sickle bar attachment designed to utilize the power unit on any standard mower and which is selectively detachable therefrom to permit the operator to trim grass and plants growing immediately adjacent to buildings, fences, curbs, sidewalks and the like.

According to this invention, an improved sickle bar attachment is provided for ready mounting on a standard type power mower. The attachment is comprised of a mechanically driven sickle bar head, a flexible drive cable attached thereto, and mounting brackets designed for attachment to any standard type power mower. When not in use as a hand manipulated tool, the sickle bar head is carried on brackets in front of the conventional cutter on the power mower. In this position the sickle bar attachment functions as a topper means and operates to cut down the tall grass or weeds before this growth is fed into the conventional cutter on the power mower. Power for the sickle bar originates from the power source utilized for driving the mower proper. To this end, the flexible drive shaft is connected by means of a coupling to an extending end of the drive shaft on the internal combustion engine or the electric motor. The operator can perform triming work by removing the sickle bar attachment from the mower and manipulating the sickle bar head in and around any physical projections of a nature which do not readily permit him to use the conventional power mower. A handle is furnished on the sickle bar head for this purpose.

The foregoing and other objects of this invention which will become more fully apparent from the following detailed description, may be achieved by the exemplifying apparatus depicted in and further described in detail in connection with the accompanying drawings, in which.

Figure 1:
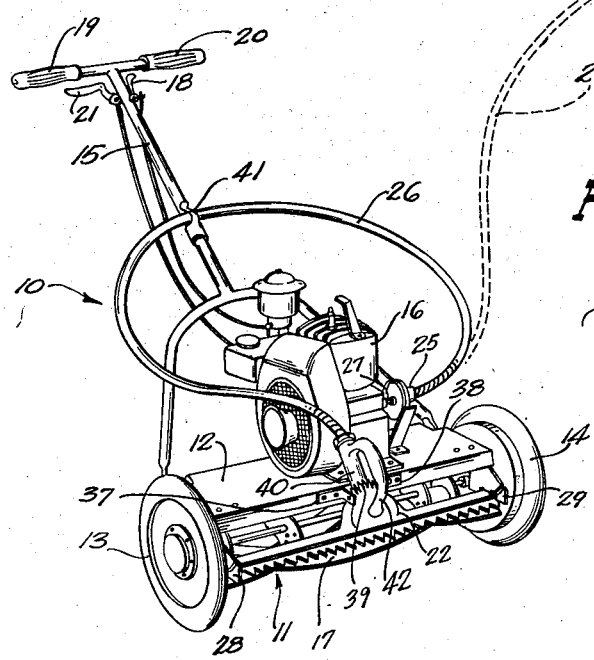
Figure 1 is a perspective view of a power lawn mower showing the sickle bar attachment incorporating the principles of the invention operatively mounted thereon, together with a dotted line showing of an operator utilizing the attachment for trimming purposes along a fence.

Referring more specifically to the drawing, and particularly to Fig. 1 thereof, a power mower 10 of the self-propelled reel type is depicted with a sickle bar attachment 11 operatively mounted thereon. The power mower 10 is comprised of a main frame 12, a pair of rubber tired wheels 13 and 14 rotatably journalled thereon to support the frame, and an extending handle 15 connected to the frame to provide a means for conveniently manipulating the power mower in a well known manner. An internal combustion engine 16, constituting a power source, is fixedly mounted on the main frame 12 in a manner to provide a power drive to the wheels 13 and 14 for propelling the power mower forwardly, and for driving a reel type cutter 17 intermediately disposed for rotative operation on the main frame between the wheels 13 and 14. Throttle control lever 18 is conveniently located near the upper end of the handle 15 and disposed between a pair of hand grips 19 and 20. A clutch control lever 21 is likewise conveniently disposed on the handle 15. Thus, the operator of the power mower can readily adjust the rate of speed at which the internal combustion engine 16 operates and can readily clutch or declutch the power source from the drive wheels and the rotary cutting reel. With these controls, the operator can readily control the power unit thereof, and manipulate the power mower in a well known manner.

It is well known, that the average caretaker of lawns is oftentimes inclined to permit the grass to grow excessively to such a degree that the conventional power mower is unable to efficiently cope with the situation. In addition, weeds with coarser stems are inclined to grow considerably faster than the grass in the outer surrounding portions of a yard. If the operator seeks to use the power mower under such circumstances, he will often find that the cutter reel 17 will rapidly become choked up with debris to such an extent that the internal combustion engine 16 will be overloaded and stalled, or that he will have to reduce the cutting rate to such an extent that it will no longer be advantageous to use a power mower. Further, if the power mower is used in the conventional manner, the operator will find that it can only be used in the open areas of the lawn with any degree of efficiency, and that areas immmediately adjacent to buildings, trees, fences, sidewalks, curbs, flower beds, etc. must be trimmed in some other manner.

Figure 2:
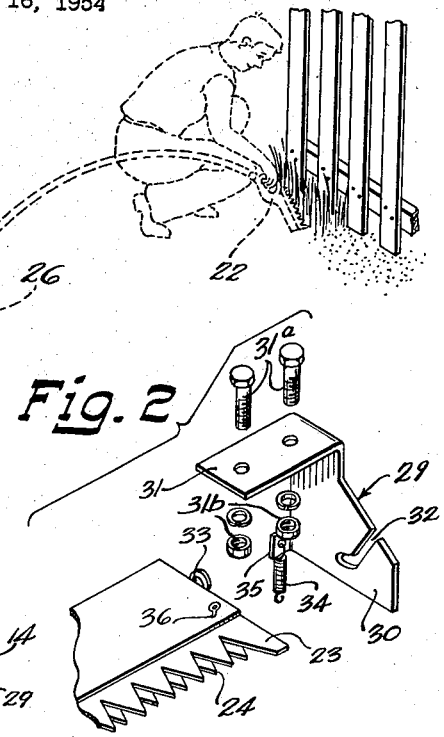
Fig. 2 is an enlarged exploded view of the component parts which make up the mounting bracket for the attachment, together with a detailed view of the mounting pin in the end of the sickle bar.
Figure 3:
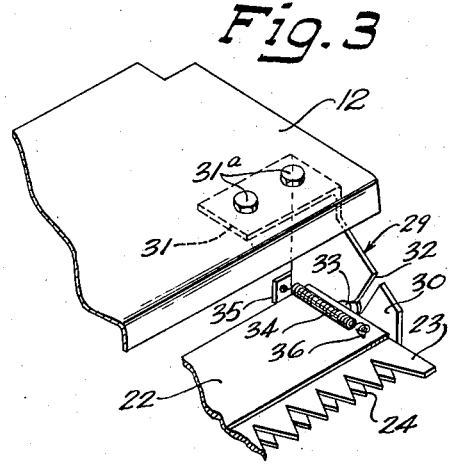
Fig. 3 is an enlarged detailed perspective view of a mounting bracket securely fixed to the power mower frame and with one end of the sickle bar operatively retained by the bracket; and, Fig. 4 is an enlarged detailed view of the mounting bracket disposed in the center of the power mower for retaining the sickle bar head in operative position.

In order to overcome the known and accepted deficiencies of conventional reel type power mowers, a sickle bar attachment 11 has been provided for attachment thereto. Such an arrangement serves to provide a sickle bar cutter disposed to supplement the reel cutter whereby the conventional power driven reel mower can be used in areas with thick weed and grass growths. The attachment is comprised of a head unit 22, including a stationary sickle bar 23 and a reciprocable sickle bar 24, a drive mechanism (not shown), together with a coupling 25 and a flexible shaft 26 operatively disposed to transmit power from the internal combustion engine 16 to the head unit 22. The coupling 25 is of the universal type designed to fit on the extending end of an output shaft 27 on the engine 16. The sickle bar attachment mounted on the front of the power mower, as shown in Fig. 1, including sickle bars 23 and 24, is operatively disposed for effectively topping weeds and grass at a predetermined height. Beyond the point of blade contact all weed and plant growth is topped to a uniform height. The head unit 22 is operatively supported on the power mower on two extending brackets 28 and 29 fixedly mounted adjacent each of the side front edges of the frame 12. As detailedly shown in Figs. 2 and 3, each of the brackets is comprised of a downwardly extending portion 30 and a horizontally extending portion 31. The portion 31 is designed to be fitted on the bottom side of the main frame 12 so that the bracket may be readily bolted thereto by means of a pair of bolts 31a and nuts 31b. Brackets 28 and 29 are of the universal type designed to fit the majority of existing power mowers. Since both brackets 28 and 29 are identical, only the structural details of bracket 29 have been described.

The sickle bar head unit 22 is operatively carried on the brackets in an inclined and angular slot 32 machined in the downwardly extending portion 30 thereof. Each slot serves to receive a pin 33 fixedly carried in the ends of the head unit 22. When the sickle bar attachment 11 is properly mounted on the front of the power mower, the head unit 22 will be rigidly supported in the slots in a manner that the sickle bars 23 and 24 are retained in a horizontal operative position. A spring 34 extensively mounted on an extending lug 35 integrally formed with the bracket and secured to the head unit 22 by means of a pin 36 threadedly secured therein serves to retain the sickle bar attachment in the aforesaid operative position.

Figure 4:
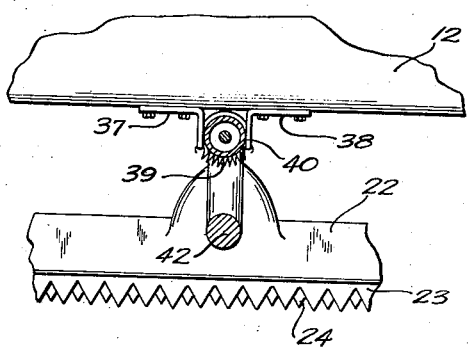

The central portion of the sickle bar head 22 is rigidly supported between a pair of angular brackets 37 and 38 bolted to the forward edge of the main frame 12 as shown in Figs. 1 and 4. A coil spring 39 secured to the extending ends of the angular brackets 37 and 38 is designed to fit around a shank portion 40 of the head 22; the attachment 11 is thereby operatively retained in abutment with the front edge of the main frame 12 of the power mower. The spring 39 may be readily removed whenever it is desirable to detach the sickle bar attachment from the power mower. A resilient clamp 41 is fixedly mounted on the handle 15 and serves to retain the flexible shaft 26 in a looped position, as shown in Fig. 1, whereby the power mower may be operated in the conventional manner without having the flexible cable impede the use thereof in any manner. As exemplified in Fig. 1, the operator can readily use the sickle bar attachment for trimming purposes by detaching the head unit 22 from the main frame 12 on the power mower. A hand grip 42 integrally formed with the shank and head 22 will materially aid the operator in trimming around buildings, fences and the like. Since the handle 42 is conveniently disposed on the head unit 22, the sickle bar attachment can be readily used by either a right or left handed person. Prior to use in this manner, the shaft 26 must be disengaged from the clamp 41 in order to utilize the full length of the flexible shaft 26. Since the clutch control lever 21 will have been previously manipulated to disconnect the mobile drive to the power mower, the engine or motor 16 will serve solely for driving the movable sickle bar 24; after the operator has satisfactorily trimmed a planting strip along a building, fence, sidewalk, or flower bed, he need only move the power mower to another position whereat he can continue the trimming aforedescribed. Since the sickle head 22 is designed as a light weight unit, the operator can manipulate the same without undue fatigue and strain. Likewise, since the sickle bars 23 and 24 are of the same width as the cutter reel 17, a considerably larger area can be readily trimmed with a single pass of the head unit 22. The full force of the power mower engine 16 is always available so that there is no question but that the operator can proceed with the trimming operation at any suitable pace.

From the foregoing disclosure it should be apparent that a very versatile garden implement has been devised. The sickle bar attachment can be readily installed on any conventional power mower with little or no effort. With the attachment in a "topping" position on the mower, the cutting load is divided between the sickle bars and the reel cutter on the mower. Thus, the operator is able to cut through a thicker growth of grass or weeds at a faster rate than was heretofore possible. Even though the sickle bar attachment is shown on a standard size power mower, it should be apparent that the attachment may just as readily be mounted on the larger size power mowers such as are used in and about cemeteries and golf courses and parks. In such cases, the trimming feature of the attachment will be especially beneficial for trimming grass and plants in and about head stones, monuments, and park equipment. With this attachment, there would be no need to lay unduly long electrical cables, as is the case if electric hand trimmers are used; neither would it be necessary to purchase a specialized trimming tool having an independent power source. Rather, a trimming device is provided which is carried by and utilizes the power source of a conventional power mower.

Although a specific form of the invention has been described in detail, in order to disclose the features of the invention, it is to be understood that the particular structure shown and described is susceptible of various modifications that will be apparent to one skilled in the art without departing from the spirit and scope of the invention, as defined in the subjoined claims.

The principles of the invention having now fully explained in connection with the foregoing description of an illustrative preferred embodying structure, we hereby claim as our invention or discovery:

1. In a manually manipulable grass trimming attachment for utilization with a power lawn mower having a rotatable cutting reel and a source of power connected to operate the mower and the cutting reel, a trimmer head unit, a flexible drive shaft operably connected to the power source of the mower and to said trimmer head unit to drive said head unit independently of the operation of the lawn mower and the cutting reel, a pair of brackets attached to the mower and disposed thereon so that a bracket is positioned on each side of the mower beyond the ends of the cutting reel, said brackets being provided with openings, means on said head unit adapted to be freely receivable within the openings in said brackets to unconstrainably support said head unit on the mower in position so that said trimmer head unit may serve as an independently driven secondary cutter for the mower for topping weeds and the like, snap acting retaining means manually actuatable for instant operation to retain said trimmer head unit on the mower in a weed topping position and instantly releasable to free said trimmer head unit so that it may be readily removed from said brackets for use as a manually manipulable independently power operated grass trimmer remotely from the mower irrespective of the operation of the mower and the cutting reel, and a handle on said trimmer head unit to facilitate manual manipulation of said trimmer head unit in an independent trimming operation, whereby said trimmer head unit may be placed in said brackets on the mower and said head unit retained thereon in position to serve as an auxiliary independently operable cutter for the mower or the operator may stop the mower and release the snap acting retaining means to free said trimmer head unit from the mower and then by simply grasping the handle of said head unit out of said brackets to employ the head unit in a grass trimming operation remotely of the mower.

2. In a manually manipulable grass trimming attachment for utilization with a power lawn mower having a rotatable cutting reel and a source of power connected to operate the mower and the cutting reel, a trimmer head unit, a flexible drive shaft operably connected to the power source of the mower and to said trimmer head unit to drive said head unit independently of the operation of the mower and the cutting reel, a pin mounted in each end of said head unit and extending outwardly thereof, a pair of brackets attached to the mower and disposed thereon so that a bracket is positioned on each side of the mower beyond the ends of the cutting reel, said brackets being provided with pin receiving means which are adapted to freely receive said pins to unconstrainably support said head unit on the mower forwardly of the cutting reel thereof in position so that said trimmer head unit may serve as a secondary cutter on the mower for topping weeds, hook connected resilient retaining means manually actuatable for instant operation to retain said trimmer head unit on the mower in a weed topping position and instantly releasable to free said trimmer head unit so that it may be readily removed from said brackets for use as a manual manipulable power operated grass trimmer remotely from the mower, and a handle on said trimmer head unit to facilitate manual manipulation of said trimmer head unit in an independent trimming operation, whereby said trimmer head unit may be placed in said brackets on the mower and said head unit retained thereon in position to serve as an auxiliary cutter for the mower or the operator may stop the mower and release said resilient retaining means to free said trimmer head unit from the mower and then by simply holding the handle may lift the head unit out of said brackets to employ the head unit in a grass trimming operation remotely of the mower.

3. In an attachment for a power operated lawn mower having a rotatable cutting reel and a power source connected to operate the mower and the reel, a pair of brackets attached to the mower in position so that said brackets are positioned on each side of the mower outwardly of the ends of the cutting reel, said brackets having a downwardly and forwardly extending portion provided with a rearwardly inclined angular slot, a manually manipulable grass cutting head unit, a pin mounted in each end of said head unit and adapted to be freely engageable within the slots in said brackets to support the head unit on the mower forwardly of the cutting reel thereof, a pair of spring elements extensively hook connected to the mower and to said head unit to retain said pins of said head unit in full engagement within the slots of said brackets to insure positive retention of said head unit in a work position, a single resilient retainer means operably connected to the mower and to said head unit to retain said head unit to the mower for unit operation, a handle on said head unit for facilitating manual manipulation of said head unit, said handle being disposed on said head unit equi-distant from the ends thereof, and a flexible drive shaft operably connected to said head unit and to the power source of the mower to operate said head unit independently of the operation of the mower and cutting reel thereof, whereby said head unit may be supported on the mower forwardly of the cutting reel thereof in said brackets and said pair of extensible resilient means may be easily and quickly attached to the mower and the head unit to maintain the pins of said head unit within the slots of said brackets to prevent said pins from being inadvertently jolted out of the slots and said head unit is resiliently retained on the mower by said single resilient means for unit operation and said head unit will be operatively connected to the power source of the mower by said flexible drive shaft independently of the operating connection between the power source and the mower and the cutting reel, and said trimmer head unit may be easily utilized for independent trimming operations remotely of the mower.

4. In a grass trimming attachment for a power lawn mower having a rotatable cutting reel and a power source connected to operate the mower and the cutting reel, a pair of brackets mounted on the mower adjacent to the sides of the mower, said brackets having forwardly extending portions provided with downwardly inclined angular slots, a trimmer head unit, pins mounted in each end of said head unit and extending outwardly therefrom, said pins being freely receivable within the slots of said brackets to support the said trimmer head on the mower forwardly of the cutting reel thereof, a second pair of brackets secured to the mower in spaced relationship and operable to receive and hold a portion of said trimmer head unit therebetween, a resilient retainer hook fastened to said second pair of brackets and yieldably engaged with the portion of said head unit engaged between said second pair of brackets to retain said head unit on the mower in a work position for a unit operation, retaining means for maintaining said pins within the slots of said brackets to prevent inadvertent displacement of said pins out of the slots, said retaining means comprising at least one extensible spring connected to the mower and to said head unit in a manner yieldably exert a force upon said head unit to maintain the pins against the bases of the slots, a handle on said head unit to facilitate manual manipulation of said head unit, said handle disposed on said head unit equi-distant from the ends thereof and constructed and arranged so as to be inclined upwardly and rearwardly of the cutting portion of said head unit when the head unit is in a horizontal work position, a flexible drive shaft connected to said head unit and to the power source of the mower and operable to operate said head unit independently of the operation of the mower and the cutting reel thereof, and a resilient clamp on the mower operable to receive said flexible drive shaft and maintain said drive shaft free and clear of the path of travel of the mower and cutting zones of the reel and said head unit, whereby said trimmer unit may be mounted on the mower in operating position to serve as an auxiliary cutting unit for the mower or removed from the mower and manually manipulated independently of the operation of the mower to trim grass remotely of the mower.

References Cited in the file of this patent

UNITED STATES PATENTS

| | | |
|---|---|---|
| 1,420,309 | Drake | June 20, 1922 |
| 1,756,346 | Dursch | Apr. 29, 1930 |
| 2,161,357 | Kaplan | June 6, 1939 |
| 2,458,200 | Renfroe et al. | Jan. 4, 1949 |
| 2,553,463 | McCulloch | May 15, 1951 |
| 2,710,517 | Huddon | June 14, 1955 |